US009819993B2

(12) United States Patent
Lin

(10) Patent No.: US 9,819,993 B2
(45) Date of Patent: Nov. 14, 2017

(54) SWITCH APPARATUS AND ELECTRONIC DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 601 days.

(21) Appl. No.: 14/444,024

(22) Filed: Jul. 28, 2014

(65) Prior Publication Data
US 2015/0032231 A1   Jan. 29, 2015

(30) Foreign Application Priority Data

Jul. 29, 2013  (CN) .......................... 2013 1 0321547

(51) Int. Cl.
| | | |
|---|---|---|
| H04N 21/436 | (2011.01) | |
| H04N 5/775 | (2006.01) | |
| H04N 21/41 | (2011.01) | |
| H04N 21/462 | (2011.01) | |
| H04N 21/4363 | (2011.01) | |
| H04N 21/4402 | (2011.01) | |

(52) U.S. Cl.
CPC ....... *H04N 21/43615* (2013.01); *H04N 5/775* (2013.01); *H04N 21/4135* (2013.01); *H04N 21/43632* (2013.01); *H04N 21/440218* (2013.01); *H04N 21/4622* (2013.01)

(58) Field of Classification Search
None
See application file for complete search history.

(56) References Cited

U.S. PATENT DOCUMENTS

| | | | | |
|---|---|---|---|---|
| 7,102,394 B1* | 9/2006 | Wilson | ..................... | G06F 1/22 323/274 |
| 2001/0012127 A1* | 8/2001 | Fukuda | ..................... | G06T 1/20 358/444 |
| 2003/0035065 A1* | 2/2003 | Kim | ............... | H04N 21/440218 348/558 |
| 2006/0132476 A1* | 6/2006 | Jan | ........................... | G06F 3/14 345/204 |
| 2008/0018518 A1* | 1/2008 | Chan | .................... | H04N 5/4403 341/176 |
| 2009/0012985 A1* | 1/2009 | Matsubara | ........... | H04L 65/605 |

(Continued)

FOREIGN PATENT DOCUMENTS

TW            M365529          9/2009

*Primary Examiner* — Tim T Vo
*Assistant Examiner* — Herve Iradukunda
(74) *Attorney, Agent, or Firm* — Steven Reiss

(57) ABSTRACT

A single electronic device can connect to and communicate with multiple independent load medias. The electronic device comprises a number of internal components, including a processor and a switch module. The processor is capable of switching between a first working mode and a second working mode. The first working mode can establish a one-to-one connection between one load media and one internal component upon a first control signal, and under the second working mode, the processor can generate a second control signal whereby independent connections are established between at least two load medias and at least two of the internal components.

11 Claims, 8 Drawing Sheets

(56) References Cited

U.S. PATENT DOCUMENTS

| | | | |
|---|---|---|---|
| 2010/0064076 A1* | 3/2010 | Chen | G06F 13/4022 |
| | | | 710/63 |
| 2010/0284669 A1* | 11/2010 | Sasaki | G06F 21/10 |
| | | | 386/252 |
| 2012/0191894 A1* | 7/2012 | Sasaki | G06F 13/387 |
| | | | 710/313 |
| 2012/0271930 A1* | 10/2012 | Tsuchida | H04L 49/40 |
| | | | 709/223 |

* cited by examiner

| PIN | First interface Display_Port1.2 | | PIN | First plug Display_Port1.2 | PIN | Second plug IEEE 1394 |
|---|---|---|---|---|---|---|
| 1 | ML_Lane3(n) | | 1 | ML_Lane0(p) | ←→ 3 | TPB*5 1 |
| 2 | GND | | 2 | GND | ←→ 2 | VG Cable ground 2 |
| 3 | ML_Lane3(p) | | 3 | ML_Lane0(n) | ←→ 4 | TPB 62 |
| 4 | ML_Lane2(n) | | 4 | ML_Lane1(p) | ←→ 5 | TPA*33 |
| 5 | GND | | 5 | GND | | |
| 6 | ML_Lane2(p) | | 6 | ML_Lane1(n) | ←→ 6 | TPA 44 |
| 7 | ML_Lane1(n) | | 7 | ML_Lane2(p) | | |
| 8 | GND | | 8 | GND | | |
| 9 | ML_Lane1(p) | | 9 | ML_Lane2(n) | | |
| 10 | ML_Lane0(n) | | 10 | ML_Lane3(p) | | |
| 11 | GND | | 11 | GND | | |
| 12 | ML_Lane0(p) | | 12 | ML_Lane3(n) | | |
| 13 | CONFIG1 | ←→ | 13 | CONFIG1 | | |
| 14 | CONFIG2 | ←→ | 14 | CONFIG2 | | |
| 15 | AUX CH(p) | ←→ | 15 | AUX CH(p) | | |
| 16 | GND | ←→ | 16 | GND | | |
| 17 | AUX CH(n) | ←→ | 17 | AUX CH(n) | | |
| 18 | Hot plug Detect | ←→ | 18 | Hot plug Detect | | |
| 19 | Return | ←→ | 19 | Return | | |
| 20 | DP PWR | ←→ | 20 | DP PWR | ←→ 1 | VP Cable power 1 |

FIG. 6

| | First interface | | | First plug | | Second plug |
|---|---|---|---|---|---|---|
| PIN | Display_Port1.2 | | PIN | Display_Port1.2 | PIN | USB3.0 |
| 1 | ML_Lane3(n) | | 1 | ML_Lane0(p) | ↔ 3 | D+ |
| 2 | GND | | 2 | GND | ↔ 4 | GND |
| 3 | ML_Lane3(p) | | 3 | ML_Lane0(n) | ↔ 2 | D- |
| 4 | ML_Lane2(n) | | 4 | ML_Lane1(p) | ↔ 6 | STDA_SSRX+ |
| 5 | GND | | 5 | GND | ↔ 7 | GND-DRAIN |
| 6 | ML_Lane2(p) | | 6 | ML_Lane1(n) | ↔ 5 | STDA_SSRX- |
| 7 | ML_Lane1(n) | | 7 | ML_Lane2(p) | ↔ 9 | STDA_SSTX+ |
| 8 | GND | | 8 | GND | | |
| 9 | ML_Lane1(p) | | 9 | ML_Lane2(n) | ↔ 8 | STDA_SSTX- |
| 10 | ML_Lane0(n) | | 10 | ML_Lane3(p) | | |
| 11 | GND | | 11 | GND | | |
| 12 | ML_Lane0(p) | | 12 | ML_Lane3(n) | | |
| 13 | CONFIG1 | ↔ | 13 | CONFIG1 | | |
| 14 | CONFIG2 | ↔ | 14 | CONFIG2 | | |
| 15 | AUX CH(p) | ↔ | 15 | AUX CH(p) | | |
| 16 | GND | ↔ | 16 | GND | | |
| 17 | AUX CH(n) | ↔ | 17 | AUX CH(n) | | |
| 18 | Hot plug Detect | ↔ | 18 | Hot plug Detect | | |
| 19 | Return | ↔ | 19 | Return | | |
| 20 | DP PWR | ↔ | 20 | DP PWR | ↔ 1 | VBUS |

FIG. 7

|  | First interface |  |  | First plug |  | Second plug |
|---|---|---|---|---|---|---|
| PIN | Display_Port1.2 |  | PIN | Display_Port1.2 | PIN | LAN |
| 1 | ML_Lane3(n) |  | 1 | ML_Lane0(p) | 1 | Tranceive Data+ |
| 2 | GND |  | 2 | GND |  |  |
| 3 | ML_Lane3(p) |  | 3 | ML_Lane0(n) | 2 | Tranceive Data- |
| 4 | ML_Lane2(n) |  | 4 | ML_Lane1(p) | 3 | Receive Data+ |
| 5 | GND |  | 5 | GND |  |  |
| 6 | ML_Lane2(p) |  | 6 | ML_Lane1(n) | 6 | Not connected |
| 7 | ML_Lane1(n) |  | 7 | ML_Lane2(p) | 4 | Not connected |
| 8 | GND |  | 8 | GND | 5 | Not connected |
| 9 | ML_Lane1(p) |  | 9 | ML_Lane2(n) | 7 | Not connected |
| 10 | ML_Lane0(n) |  | 10 | ML_Lane3(p) | 8 | Not connected |
| 11 | GND |  | 11 | GND |  |  |
| 12 | ML_Lane0(p) |  | 12 | ML_Lane3(n) |  |  |
| 13 | CONFIG1 |  | 13 | CONFIG1 |  |  |
| 14 | CONFIG2 |  | 14 | CONFIG2 |  |  |
| 15 | AUX CH(p) |  | 15 | AUX CH(p) |  |  |
| 16 | GND |  | 16 | GND |  |  |
| 17 | AUX CH(n) |  | 17 | AUX CH(n) |  |  |
| 18 | Hot plug Detect |  | 18 | Hot plug Detect |  |  |
| 19 | Return |  | 19 | Return |  |  |
| 20 | DP PWR |  | 20 | DP PWR | 1 | VP Cable power 1 |

FIG. 8

SWITCH APPARATUS AND ELECTRONIC DEVICE

CROSS-REFERENCE TO RELATED APPLICATIONS

This application claims priority to Chinese Patent Application No. 201310321547.7 filed on Jul. 29, 2013 in the China Intellectual Property Office, the contents of which are incorporated by reference herein.

FIELD

The present disclosure relates to switches.

BACKGROUND

Televisions can be accessed by an external device for displaying images and videos stored in the external device.

BRIEF DESCRIPTION OF THE FIGURES

Implementations of the present technology will now be described, by way of example only, with reference to the attached figures.

FIG. 6 is a diagram of an embodiment of a relationship between pins of a first interface and pins of a first plug and a second plug.

FIG. 7 is a diagram of another embodiment of the relationship between the pins of the first interface and the pins of the first plug and the second plug.

FIG. 8 is a diagram of another embodiment of the relationship between the pins of the first interface and the pins of the first plug and the second plug.

DETAILED DESCRIPTION

Figure 1:
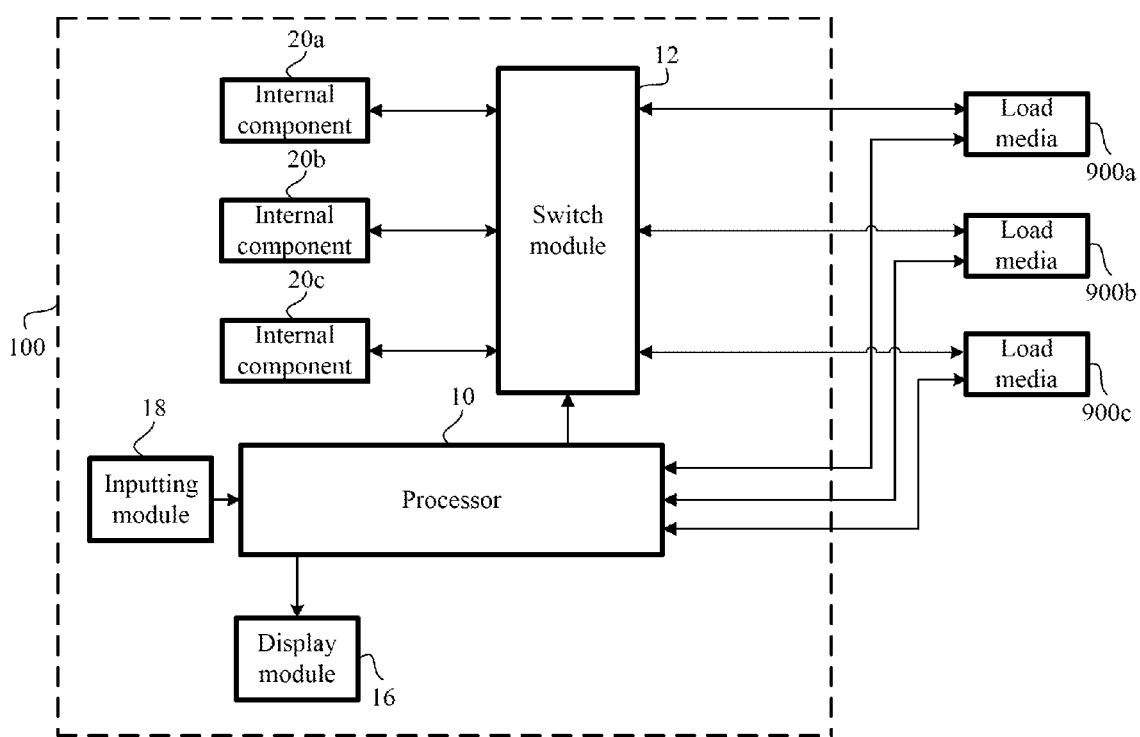
FIG. 1 is a block diagram of an embodiment of an electronic device connected to a plurality of load medias, the electronic device comprising a processor and a switch module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

An electronic device capable of simultaneously communicating with at least two connected load medias is described.

FIG. 1 illustrates an embodiment of an electronic device 100 coupled to a plurality of load medias 900a-900n. In at least one embodiment, the electronic device 100 can connects wirelessly with any or all of the three load medias 900a-900c. In other embodiments, the electronic device 100 connects via wires with the three load medias 900a-900c.

The electronic device 100 includes a processor 10, a switch module 12, a display module 16, an inputting module 18, and a plurality of internal components 20a-20c corresponding to the load medias 900a-900c in a one-to-one relationship. In at least one embodiment, the internal component can be a hard disk or a CD drive, and the number of the internal components is three.

The processor 10 connects with the load medias 900a-900c, the switch module 12, and the inputting module 18. The processor 10 is capable of switching between a first working mode and a second working mode. In at least one embodiment, a predetermined key (not shown) of the inputting module 18 is pressed to switch between the first working mode and the second working mode. In the first working mode, one of the load medias 900a-900n and one of the internal components 20a-20c is selected by user, and the processor 10 generates a first control signal. In the second working mode, at least two of the internal components 20a-20n and at least two of the load medias 900a-900c are selected by user, and the processor 10 generates a second control signal.

The switch module 12 makes connections and breaks connections between the internal components 20a-20c and the load medias 900a-900c. The switch module 12 turns on to establish an electrical connection between the selected load media of the load medias 900a-900c and the one of internal components 20a-20c, in response to the first control signal. Thus the selected load media and the internal component connected to the switch module 12 are in communication with each other. The switch module 12 turns on to establish independent electrical connections between the selected load medias and the internals components in response to the second control signal. Thus the electronic device 100 can simultaneously communicate with the selected load medias. In at least one embodiment, the communication is a bi-directional data transfer process.

The display module 16 connects with the processor 10. The display module 16 displays on an interface information which is obtained by the processor 10. In at least embodiment, the display module 16 can be a touch screen.

The inputting module 18 connects with the processor 10. The inputting module 18 selects at least one of the load medias 900a-900c based on the information displayed on the display module 16. In at least one embodiment, the inputting module 18 can be a virtual keyboard on the display module 16 or buttons presented on the electronic device 100.

Figure 2:
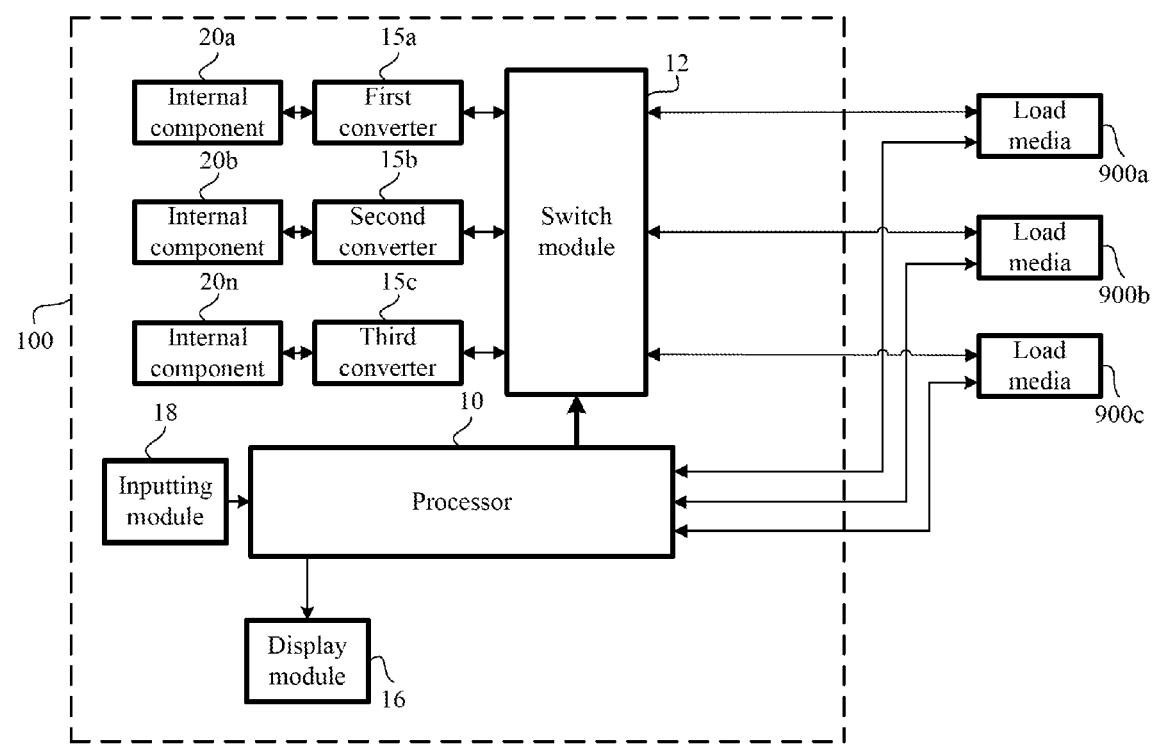
FIG. 2 is a block diagram of another embodiment of the electronic device, the electronic device connecting with the load medias through a plurality of converting members.

FIG. 2 illustrates that the electronic device 100 further comprises three converters 15a-15c. The converters 15a-15c connect between the internal components 20a-20n and the switch module 12, and further connect to the processor 10. In at least one embodiment, the converter 15a is a IEEE 1394/External Serial Advanced Technology Attachment (eSATA) format converter. The second converter 15b is a Universal Serial Bus (USB)/eSATA format converter. The third converter 15c is a Local Area Network (LAN)/eSATA format converter.

The load medias 900a-900c are capable of accepting and outputting data in different formats. In at least one embodiment, the load media 900a outputs data in the IEEE 1394 format, the load media 900b outputs data in the USB format, and the load media 900c outputs data in a LAN format.

The processor 10 further detects the format of the data outputted by the selected load media(s) to generate differently-formatted control signals. Under the first working mode, the switch module 12 turns on to establish an electrical connection between the selected load media and a converter which matches the formatting of the data. Thus, the matching converter converts data received from the selected load media. The converted data is stored in the internal component connected to the matching converter, or can be used to drive the internal component connected to the matching converter. Under the second working mode, the switch module 12 turns on to establish independent electrical connections between each of the selected load medias and the converters respectively matching the formats of the data. Thus, the electronic device 100 simultaneously communicates with the selected load medias, each converter converts the data received from the matched selected load media, and the converted data is stored in the internal component connected to the converter or is used for driving the internal component connected to the converter.

Figure 3:
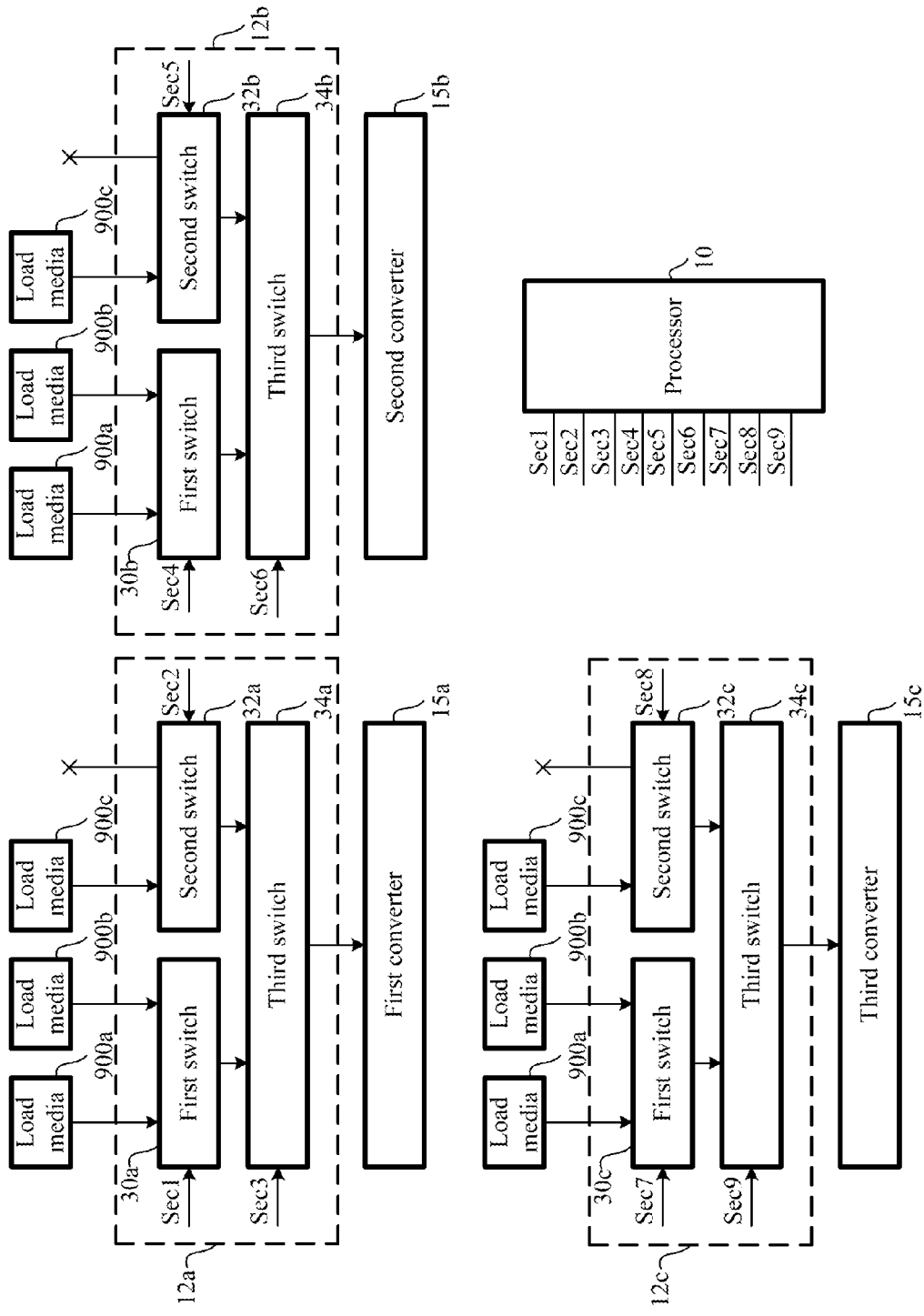
FIG. 3 is a block diagram of an embodiment of the switch module of FIG. 1 of the electronic device of FIG. 1.

FIG. 3 illustrates that the switch module 12 includes a plurality of switch units 12a-12c corresponding to the load medias 900a-900c. The switch unit 12a can connect between the converter 15a and the load medias 900a-900c. The switch unit 12b connects between the second converter 15b and the load medias 900a-900c. The switch unit 12c connects between the third converter 15c and the load medias 900a-900c. Each of the switch units 12a-12c includes first switches 30a-30c, second switches 32a-32c, and third switches 34a-34c.

Each of the first, second, and third switches, 30a-30c, 32a-32c, and 34a-34c, includes a first inputting terminal, a second inputting terminal, and an outputting terminal. The first and second inputting terminals of the first switch 30a respectively connect to the load medias 900a-900b. The outputting terminal of the first switch 30a connects to the first inputting terminal of the third switch 34a. The first inputting terminal of the second switch 32a connects to the load media 900c. The second inputting terminal of the second switch 32a is left floating. The output inputting terminal of the second switch 32a connects to the second inputting terminal of the third switch 34a. The outputting terminal of the third switch 34a connects to the converter 15a.

The first and second inputting terminals of the second switch 30b respectively connect to the load medias 900a-900b. The outputting terminal of the first switch 30b connects to the first inputting terminal of the third switch 34b. The first inputting terminal of the second switch 32b connects to the load media 900c. The second inputting terminal of the second switch 32b is left floating. The output inputting terminal of the second switch 32b connects to the second inputting terminal of the third switch 34b. The outputting terminal of the third switch 34b connects to the converter 15b.

The first and second inputting terminals of the second switch 30c respectively connect to the load medias 900a-900b. The outputting terminal of the first switch 30c connects to the first inputting terminal of the third switch 34c. The first inputting terminal of the second switch 32c connects to the load media 900c. The second inputting terminal of the second switch 32c is left floating. The output inputting terminal of the second switch 32c connects to the second inputting terminal of the third switch 34c. The outputting terminal of the third switch 34c connects to the converter 15c.

Figure 4:
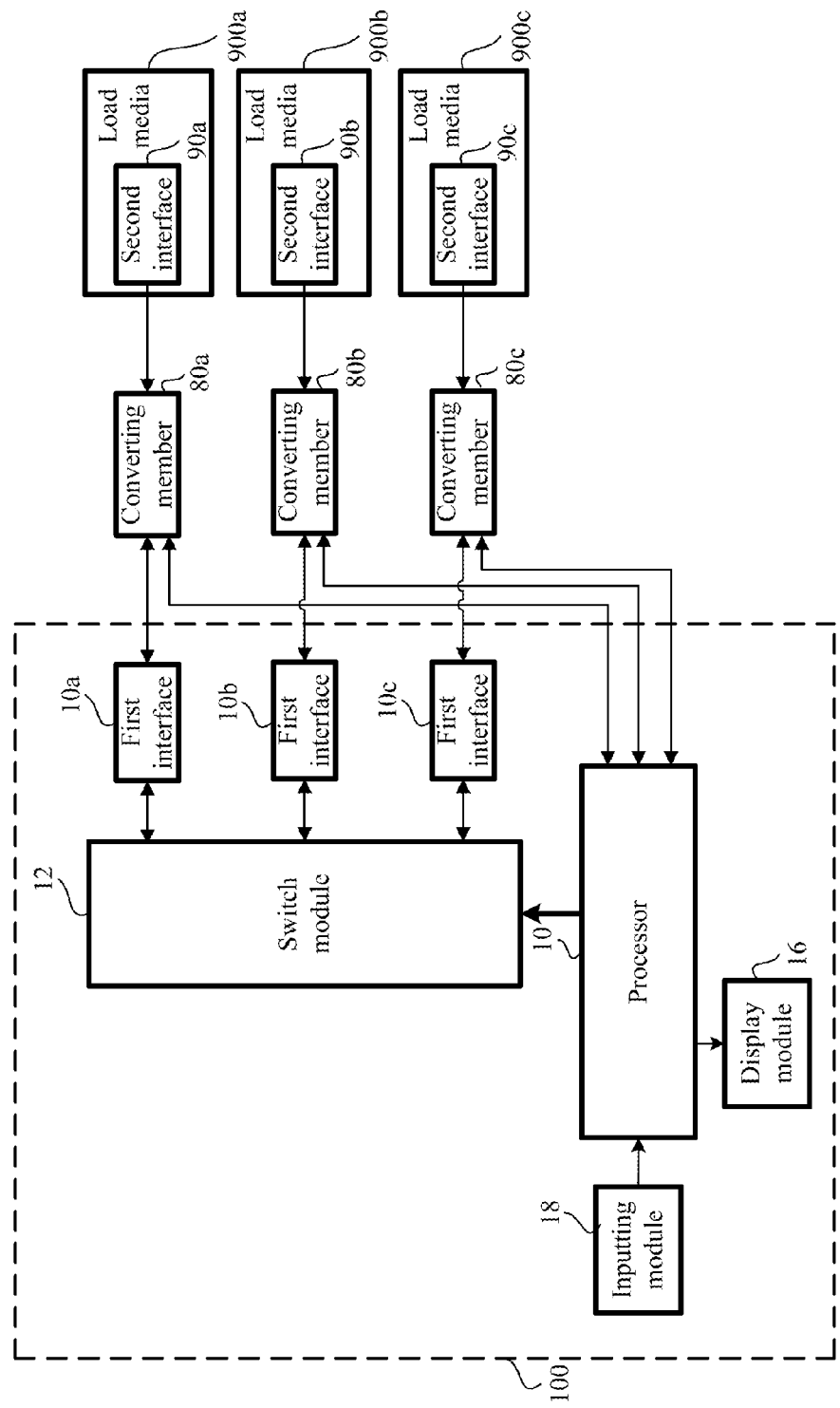
FIG. 4 is a block diagram of an embodiment of the switch module of FIG. 2.

FIG. 4 illustrates that the electronic device 100 further includes three first interfaces 10a-10c and three converter members 80a-80c. Each of the three converter members 80a-80c connects between one first interface 10a-10c and one second interface 90a-90c. In at least one embodiment, the first interfaces 10a-10c are display port (DP) interfaces; one of the second interfaces 90a-90c is a IEEE1394 type interface, one of the second interfaces 90a-90c is a USB type interface, and one of the second interfaces 90a-90c is a LAN type interface.

Figure 5:
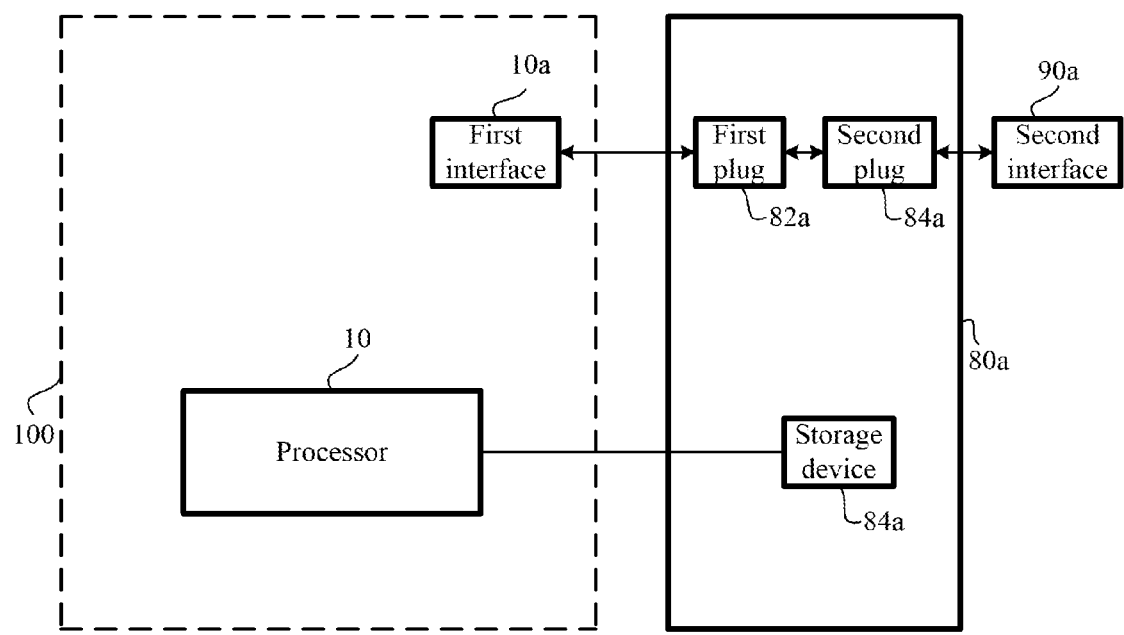
FIG. 5 is a block diagram of an embodiment of the converting member of FIG. 2.

FIG. 5 illustrates that the converter member 80a includes a first plug 82a, a second plug 84a, and a storage device 86a. The first plug 82a detachably connects to the first interface 10a, and the second plug 84a detachably connects to the load media 900a. The storage device 86a stores a format code. The construction of the converter members 80b-80c is similar to the construction of the converter member 80a. In at least one embodiment, the converter member 80a stores an IEEE 1394 format code, the converter member 80b stores a USB format code, and the converter member 80c stores a LAN format code. The first plug 82a of the converter member 80a is a DP type plug, and the second plug 84a of the converter member 80a is an IEEE 1394 type plug. FIG. 6 shows the relationship between the pins of the first interface 10a and the pins of the first and second plugs 82a and 84a.

Referring to FIG. 6, the first plug 82a includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84a of the converter member 80a includes a TPB*51 pin, a VG cable ground 2 pin, a TPB 62 pin, a TPA*33 pin, a TPA 44 pin, and a VP Cable power 1 pin. The TPB*51 pin connects with the ML_Lane0 negative pin. The VG cable ground 2 pin connects with the first grounded pin. The TPB 62 pin connects with the ML_Lane0 negative pin. The TPA*33 pin connects with the ML_Lane1 positive pin. The TPA 44 pin connects with the ML_Lane1 negative pin. The VP Cable power 1 pin connects with the DP PWR pin.

The first plug 82b of the converter member 80b is a DP type plug, and the second plug 84b of the converter member 80b is a USB type plug. FIG. 7 shows the relationship between the pins of the first interface 10b and the pins of the first and second plugs 82b and 84b.

Referring to FIG. 7, the first plug 82b includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84b of the converter member 80b includes a D− pin, a D+ pin, a GND pin, an STDA_SSRX− pin, an STDA_SSRX+ pin, a GND_DRAIN pin, an STDA_SSTX− pin, an STDA_SSRX+ pin, and a VBUS pin. The D+ pin connects with the ML_Lane0 positive pin. The GND pin connects with the first grounded pin. The D− pin connects with the first ML_Lane0 negative pin. The STDA_SSRX+ pin connects with the ML_Lane1 positive pin. The GND_DRAIN pin connects with the second grounded pin. The STDA_SSRX− pin connects with the ML_Lane2 negative pin. The VP Cable power 1 pin connects with the DP PWR pin. The VBUS pin connects to the DP PWR.

The first plug 82c of the converter member 80c is a DP type plug, and the second plug of the converter member 80c is a USB type plug. FIG. 8 shows the relationship between the pins of the first interface 10c and the pins of the first and second plugs 82c and 84c.

Referring to FIG. 8, the first plug 82c includes an ML_Lane0 positive pin, a first grounded pin, an ML_Lane0 negative pin, an ML_Lane1 positive pin, a second grounded pin, an ML_Lane1 negative pin, an ML_Lane2 positive pin, a third grounded pin, an ML_Lane2 negative pin, an ML_Lane3 positive pin, a fourth grounded pin, an ML_Lane3 negative pin, a config1 pin, a config2 pin, an AUX CH positive pin, a fifth grounded pin, an AUX CH negative pin, a hot-plug detect pin, a return pin, and a DP PWR pin. The second plug 84c of the converter member 80c includes a Transceive Data+ pin, a Transceive Data− pin, a Receive Data+ pin, and a Receive Data− pin. The Transceive Data+ pin connects with the ML_Lane0 positive pin. The Transceive Data− connects with the ML_Lane0 negative pin. The Receive Data+ pin connects with the ML_Lane1 positive pin. The Receive Data− pin connects with the ML_Lane1 negative pin.

The processor 10 further stores a table of the relationship between the identified formats and the codes stored in the storage device of the converter member 80a-80c. Under the first working state, when one of the load media 900a-900c is selected by user, the processor 10 establishes the identified format by looking up the table based on the read code stored in the converter member connected to the selected load media. The processor 10 generates a first control signal with the identified format. The switch module 12 connects to the converter which matches the identified format in response to the first control signal. The data outputted by the selected load media is transmitted to the switch module 12 by being passes through the correct converter member, and the correct first interface. Thus, the converter which matches transmits the received data to the internal component which is connected with the matching converter.

Under the second working state, when at least two of the load medias 900a-900c are selected by user, the processor 10 establishes the identified format by looking up the table based on the read codes stored in the converter members connected to the selected load medias. The processor 10 generates a second control signal with the identified format. The switch module 12 connects to the respective converters matching the identified format in response to the second control signal. The data types outputted by the selected load medias are respectively transmitted to the switch module 12 by being passed through the correct converter member, and the correct first interface. Thus, the converters matching the identified format transmit the received data to the corresponding internal components.

For example, under the first working mode, the load media 900a is selected, the switch module 12 turns on to establish an electrical connection between the load media 900a and the first converter 15a. The data outputted by the load media 900a is transmitted to the switch module 12 by being passed through the converter member 80a connected to the load media 900a, and the first interface 10a. Thus, the first converter 15a transmits the received data to the internal component 20a.

Under the second working mode, the load medias 900b-900c are selected, the switch module 12 turns on to establish an electrical connection between the load media 900b and the second converter 15b, and an electrical connection between the load media 900c and the third converter 15c. The data outputted by the load media 900b is transmitted to the switch module 12 by being passed through the converter member 80a connected to the load media 900b, and the first interface 10b. The data outputted by the load media 900c is transmitted to the switch module 12 by being passed through the converter member 80c connected to the load media 900c, and the first interface 10c. Thus, the first converter 15b transmits the received data to the internal component 20b and the second converter 15c transmits the received data to the internal component 20c.

In use, the electronic device 100 is capable of simultaneously connecting and communicating with at least two selected load medias. Thus, communication convenience between internal components and the selected user load media increases.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. An electronic device connected with a plurality of load medias, the electronic device comprising:
   a plurality of internal components corresponding to the plurality of load medias in a one-to-one relationship;
   a processor configured to generate different control signals;
   an inputting module connected to the processor and configured to select at least one of the load medias;
   a plurality of converters corresponding to the internal components in a one-to-one relationship; and
   a switch module connected to the plurality of internal components, the plurality of load medias, and the processor;

wherein each of the converters connects between the corresponding internal component and the switch module;

wherein each of the converters converts received data into a specified format;

wherein the processor detects the data format outputted by the selected load media(s) to generate different control signals with different format identifiers;

wherein a predetermined key of the inputting module is pressed to switch between a first working mode and a second working mode;

wherein under the first working mode, when a first load media is selected, the processor generates a first control signal with a format identifier, the switch module establishes an electronic connection between the selected load media and one of the plurality of internal components in response to the first control signal, and the switch module further establishes the connection between the first load media and the converter matched with the format identifier;

wherein under the second working mode, when at least two of the plurality of load medias are selected, the processor generates a second control signal with the format identifiers, the switch module establishes electrical connections between the selected load medias and at least two of the plurality of internal components, thus the electronic device simultaneously connect with at least two of the plurality of internal components, thereby enabling the electronic device to communicate with the selected load medias; and the switch module further establishes the respective connections between the selected load medias and the converters matched with the format identifiers.

2. The electronic device of claim 1, wherein the number of the plurality of load medias is three; the switch module comprises three switch units; each of the switch units comprises a first switch, a second switch, and a third switch.

3. The electronic device of claim 2, wherein the first switch, the second switch, and the third switch includes a first inputting terminal, a second inputting terminal, and an outputting signal; the first and second inputting terminal of the first switch connect to the two of the three load medias respectively, the outputting terminal of the first switch connects to the first inputting terminal of the third switch; the first inputting terminal of the second switch connects to the other of the three load medias; the second inputting terminal of the second switch is floated.

4. The electronic device of claim 1, wherein the electronic device connects to the plurality of load medias through different type converter members respectively; each of the converter members stores a predetermined format code; the processor stores a table of the relationship between the format identifiers and the codes; the processor reads the predetermined code in the converter connected to the selected load media(s), and obtains the format identifier(s) by looking up the table.

5. The electronic device of claim 1, further comprising a display module connected to the processor; wherein the processor further obtains interface information related to the plurality of the load medias; the display module displays the obtained information, and the inputting module selects at least one of the plurality of load medias based on the interface information displayed on the display module.

6. The electronic device of claim 1, wherein there are three load medias, one of the load medias is used for outputting data in IEEE 1394 format; one of the load medias is used for outputting data in USB format; one of the load medias is used for outputting data in LAN format.

7. A switch apparatus in an electronic device with a plurality of internal components, a plurality of converters, and a processor; the switch apparatus connected between the internal components and a plurality of load medias besides the electronic device; the switch apparatus comprising:

a switch module connected to the internal components through a corresponding converter, the plurality of load medias, and the processor;

wherein each of the converters connects between the corresponding internal component and the switch module;

wherein each of the converters converts received data into a specified format;

wherein an inputting module connects to the processor and is configured to select at least one of the load medias;

wherein the processor detects the data format outputted by the selected load media(s) to generate different control signals with different format identifiers;

wherein a predetermined key of the inputting module is pressed to switch between a first working mode and a second working mode;

wherein under the first working mode, when a first load media is selected, the processor generates a first control signal with a format identifier, the switch module establishes an electronic connection between the first load media and one of the internal components in response to the first control signal, and the switch module further establishes the connection between the first load media and the converter matched with the format identifier;

wherein under the second working mode, when at least two of the plurality of the load medias are selected, the processor generates a second control signal with the format identifiers, the switch module establishes electronically connections between the selected load medias and at least two of the internal components, thus the electronic device simultaneously connects with at least two of the internal components, thereby enabling the electronic device to communicate with the selected load medias; and the switch module further establishes the respective connections between the selected load medias and the converters matched with the format identifiers.

8. The switch apparatus of claim 7, wherein the number of the plurality of load medias is three; the switch module comprises three switch units; each of the switch units comprises a first switch, a second switch, and a third switch.

9. The switch apparatus of claim 8, wherein the first switch, the second switch, and the third switch includes a first inputting terminal, a second inputting terminal, and an outputting signal; the first and second inputting terminal of the first switch connect to the two of the load medias respectively, the outputting terminal of the first switch connects to the first inputting terminal of the third switch; the first inputting terminal of the second switch connects to the other of load medias; the second inputting terminal of the second switch is floated.

10. The switch apparatus of claim 7, wherein the electronic device connects to the plurality of the load medias through different type converter members respectively; each of the converter members stores a predetermined format code; the processor stores a table of the relationship between the format identifiers and the codes; the processor reads the predetermined code in the converter connected to the selected load media(s), and obtains the format identifier(s) by looking up the table.

11. The switch apparatus of claim 7, wherein there are three load medias, one of the load medias is used for outputting data in IEEE 1394 format; one of the load medias is used for outputting data in USB format; one of the load medias is used for outputting data in LAN format.

\* \* \* \* \*